(12) United States Patent  
Lee et al.

(10) Patent No.: US 9,274,369 B1
(45) Date of Patent: Mar. 1, 2016

(54) SEAMLESS DISPLAY WITH TAPERED FUSED FIBER BUNDLE OVERLAY

(71) Applicant: Google Inc., Mountain View, CA (US)

(72) Inventors: Johnny Lee, Mountain View, CA (US); Eric Peeters, Mountain View, CA (US); Eric Teller, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 581 days.

(21) Appl. No.: 13/664,147

(22) Filed: Oct. 30, 2012

(51) Int. Cl.
*H01J 29/10* (2006.01)
*G02F 1/1335* (2006.01)
*F21V 8/00* (2006.01)

(52) U.S. Cl.
CPC ........ *G02F 1/133524* (2013.01); *G02B 6/0005* (2013.01)

(58) Field of Classification Search
CPC ......... G09F 9/30; G09F 9/3026; G09F 9/305; G09F 9/35; G02B 6/4298; G02B 6/3678; G02B 6/06; G02B 6/32; G02B 6/0005; Y10S 385/901; G02F 1/133524
USPC .......... 313/110, 475, 372; 362/511, 554, 558, 362/241, 551, 556, 581; 385/120, 115–116, 385/901; 345/1.3, 40, 55, 32
See application file for complete search history.

(56) References Cited

U.S. PATENT DOCUMENTS

| 3,402,000 | A | * | 9/1968 | Crawford | 385/116 |
| 4,183,630 | A |  | 1/1980 | Funada et al. |  |
| 4,299,447 | A | * | 11/1981 | Soltan et al. | 349/159 |
| 4,867,530 | A | * | 9/1989 | Sedlmayr | 385/116 |
| 4,874,227 | A | * | 10/1989 | Matsukawa et al. | 349/73 |
| 5,877,492 | A |  | 3/1999 | Fujieda et al. |  |
| 6,195,016 | B1 |  | 2/2001 | Shankle et al. |  |
| 6,224,213 | B1 |  | 5/2001 | Kobayashi |  |
| 6,304,703 | B1 | * | 10/2001 | Lowry | 385/120 |
| 6,337,724 | B1 |  | 1/2002 | Itoh et al. |  |
| 6,418,254 | B1 | * | 7/2002 | Shikata et al. | 385/116 |
| 6,885,010 | B1 |  | 4/2005 | Traynor et al. |  |
| 7,071,614 | B2 |  | 7/2006 | Anandan et al. |  |
| 7,197,218 | B2 | * | 3/2007 | Cok et al. | 385/120 |
| 7,202,602 | B2 |  | 4/2007 | Anandan |  |
| 7,228,051 | B2 | * | 6/2007 | Cok et al. | 385/146 |
| 7,292,760 | B2 | * | 11/2007 | Kerr et al. | 385/120 |
| 7,498,743 | B2 |  | 3/2009 | Anandan |  |
| 7,515,800 | B2 |  | 4/2009 | Reichel et al. |  |
| 7,592,971 | B2 | * | 9/2009 | Chang et al. | 345/1.3 |
| 7,658,526 | B2 | * | 2/2010 | Henson et al. | 362/554 |

(Continued)

FOREIGN PATENT DOCUMENTS

CN 102150099 A 8/2011
JP 2008-309963 A 12/2008

(Continued)

*Primary Examiner* — Anne Hines
*Assistant Examiner* — Jose M Diaz
(74) *Attorney, Agent, or Firm* — Blakely Sokoloff Taylor & Zafman LLP (57) ABSTRACT

A display tile includes a display panel and a fused fiber bundle overlay. The display panel includes display pixels and a bezel surrounding the display pixels. The fused fiber bundle overlay includes an input side mounted adjacent to the display panel and optically aligned with the display pixels to receive image light, an emission side opposite the input side to emit the image light, and an array of fused fibers each extending from the input side to the emission side and each including an input end and an emission end. At least a portion of the fused fibers are tapered.

28 Claims, 8 Drawing Sheets

(56) References Cited

U.S. PATENT DOCUMENTS

| | | |
|---|---|---|
| 7,663,312 B2 | 2/2010 | Anandan |
| 7,742,120 B2 | 6/2010 | Bayley et al. |
| 7,934,862 B2 | 5/2011 | Anandan |
| 7,935,963 B2 | 5/2011 | Anandan |
| 9,025,111 B2 | 5/2015 | Teller et al. |
| 2002/0080302 A1 | 6/2002 | Dubin et al. |
| 2002/0097978 A1* | 7/2002 | Lowry et al. .................. 385/147 |
| 2003/0002832 A1* | 1/2003 | Lowry ......................... 385/120 |
| 2003/0234343 A1* | 12/2003 | Cok et al. .................... 250/208.1 |
| 2004/0008155 A1* | 1/2004 | Cok ............................... 345/1.3 |
| 2005/0185114 A1* | 8/2005 | Cok ............................... 349/73 |
| 2013/0278872 A1* | 10/2013 | Teller et al. .................... 349/96 |

FOREIGN PATENT DOCUMENTS

| | | |
|---|---|---|
| JP | 2009-098239 A | 5/2009 |
| KR | 10-2011-0008486 A | 1/2011 |
| TW | 201028828 A | 8/2010 |

* cited by examiner

SEAMLESS DISPLAY WITH TAPERED FUSED FIBER BUNDLE OVERLAY

TECHNICAL FIELD

This disclosure relates generally to displays, and in particular but not exclusively, relates to tiling displays.

BACKGROUND INFORMATION

Large wall displays can be prohibitively expensive as the cost to manufacture display panels rises exponentially with display area. This exponential rise in cost arises from the increased complexity of large monolithic displays, the decrease in yields associated with large displays (a greater number of components must be defect free for large displays), and increased shipping, delivery, and setup costs. Tiling smaller display panels to form larger multi-panel displays can help reduce many of the costs associated with large monolithic displays.

Figure 1A:
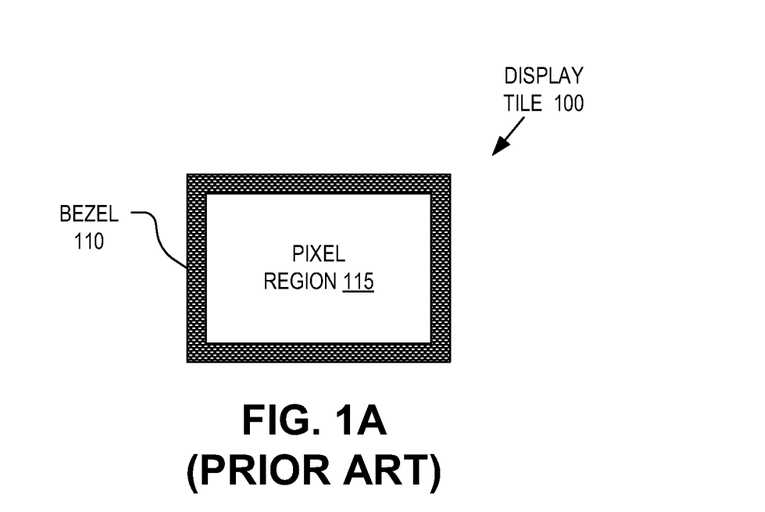
FIGS. 1A & 1B (PRIOR ART) illustrate conventional display panel tiling.
Figure 1B:
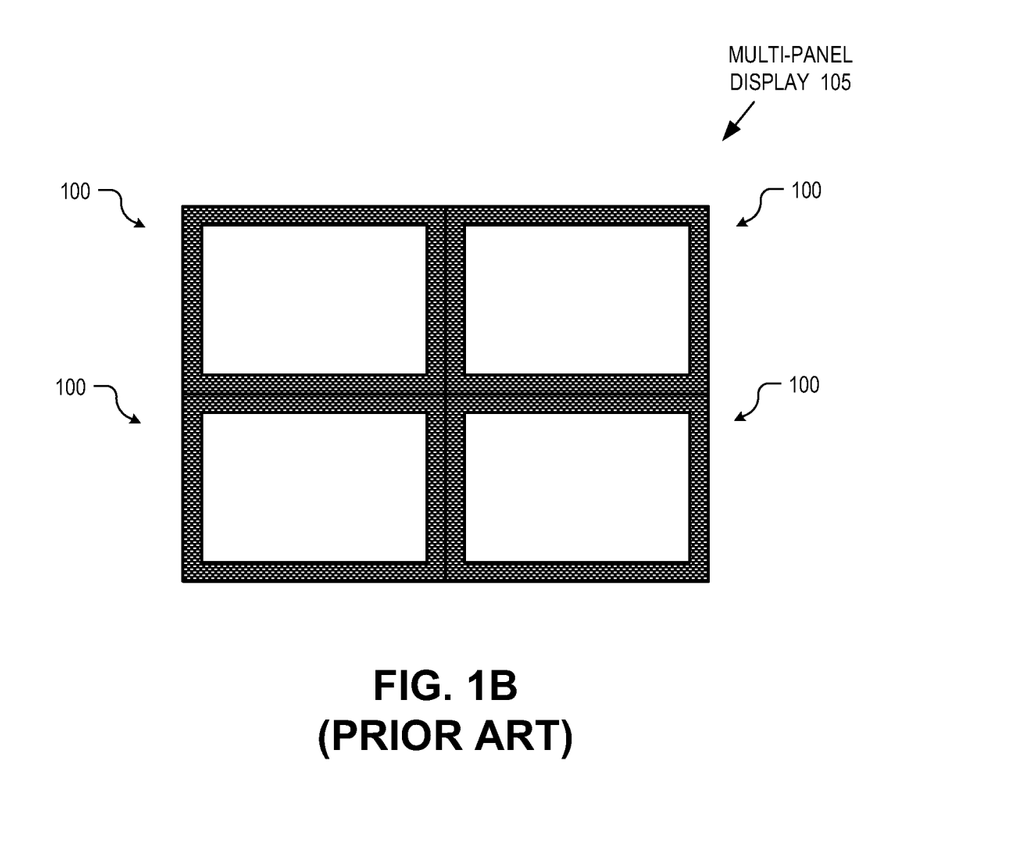

FIGS. 1A and 1B illustrate how tiling multiple smaller, less expensive display tiles 100 together can achieve a large multi-panel display 105, which may be used as a large wall display. The individual images displayed by each display panel 100 may constitute a sub-portion of the larger overall composite image collectively displayed by multi-panel display 105. While multi-panel display 105 can reduce costs, visually it has a major drawback. Each display tile 100, includes a bezel 110 around its periphery. Bezel 110 is a mechanical structure that houses pixel region 115 in which the display pixels are disposed. In recent years, manufactures have reduced the thickness of bezel 110 considerably to less than 2 mm. However, even these thin bezel trims are still very noticeable to the naked eye, distract the viewer, and otherwise detract from the overall visual experience.

Various other approaches for obtaining seamless displays include display lensing, blended projection, stackable display cubes, and LED tiles. Display lensing places a single contiguous lens in front of each display tile 100 to present a fused borderless image in a particular "sweet spot." However, the viewing angle is relative narrow and image distortion along continuous lines still occurs. Blended projection uses software stitching and mechanical mounting of traditional projection screens. Currently, blended projection uses relatively low cost hardware and is a good option for non-planar surfaces. However, there are significant physical constraints on usage and installation and requires regular maintenance and sophisticated calibration. Stackable display cubes are a rear projection technology. Each display cube is relative deep and the seams between adjacent cubes are easily visible. LED tiles are arrays of discrete RGB light emitting diodes ("LED"). LED tiles can have virtually invisible seams, since the seams run between pixels. However, LED tiles are expensive and have large pixel pitches (e.g., 2 to 4 mm) resulting in low resolution images. Display tiling has benefits for both large and small displays (e.g., small folding displays).

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

DETAILED DESCRIPTION

Embodiments of an apparatus and method of operation for seamless display panel tiling using tapered fused fiber bundle overlays are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 2A:
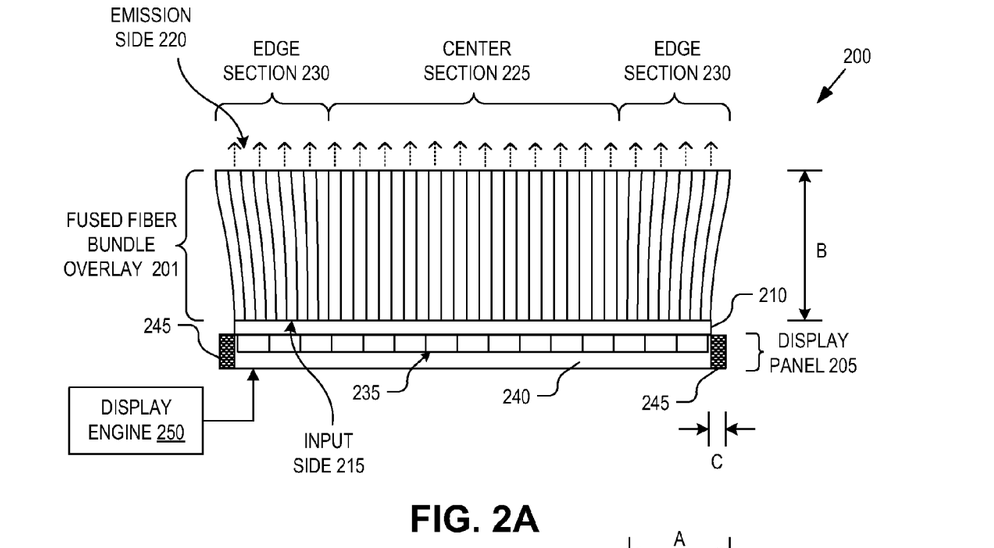
FIG. 2A is a side view of a display tile with a fused fiber bundle overlay, in accordance with an embodiment of the disclosure.
Figure 2B:
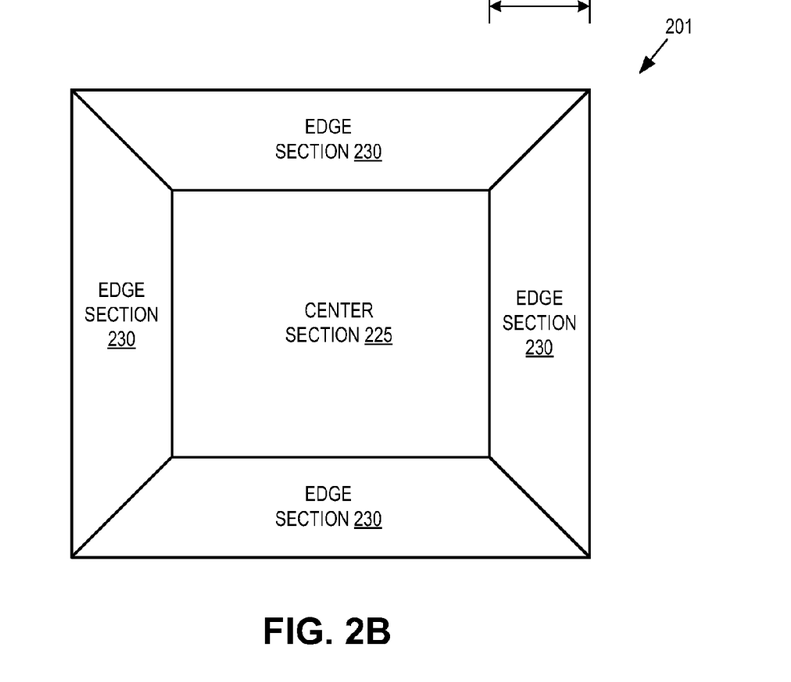
FIG. 2B is a plan view illustrating the multiple sections of a fused fiber bundle overlay, in accordance with an embodiment of the disclosure.

FIGS. 2A & 2B illustrate a display tile 200 including a fused fiber bundle overlay 201, in accordance with an embodiment of the disclosure. FIG. 2A is a side view of display tile 200 while FIG. 2B is a plan view of the same. The illustrated embodiment of display tile 200 includes fused fiber bundle overlay 201, display panel 205, and interconnecting optics 210. The illustrated embodiment of fused fiber bundle overlay 201 includes an input side 215, an emission side 220, and fused fibers extending there between. The fused fibers each include an input end with an input aperture at input side 215 and an output end with an output aperture at emission side 220. The illustrated embodiment of fused fiber bundle overlay 201 is divided into a center section 225 and four surrounding edge sections 230. In the illustrated embodiment center section 225 includes straight fused fibers while edge sections 230 include tapered fused fibers. The illustrated embodiment of display panel 205 includes pixel array 235 disposed within a substrate 240 surrounded by a bezel 245 that operates as a housing trim and a display engine 250. The term bezel is defined broadly herein to include both the outer casing of a display panel and any non-active border around the active pixels of pixel array 235. Although display engine 250 is illustrated external to display panel 205, it may be implemented as internal circuitry of display panel 205.

Fused fiber bundle overlay 201 is disposed over display panel 205 with input side 215 aligned with the array of display pixels 235. The fused fibers receive emitted image light from display pixels 235 at their input ends and guide the image light to their emission ends for emission out emission side 220. Fused fiber bundle overlay 201 is a rigid structure that enlarges or magnifies at least a portion of the image emitted from display panel 205. Emission side 220 has a larger surface area relative to input side 215, such that the perimeter sides of edge sections 230 overhang bezel 245 to conceal bezel from the front.

In the illustrated embodiment, fused fiber bundle overlay 201 is separated into five sections: one center section 225 and four edge sections 230. These sections may be fabricated individually and then bonded together to form fused fiber bundle overlay 201. Center section 225 is made of straight fused fibers each having a diameter that is constant over its length from its input end to its emission end. In contrast, edge sections 230 include tapered fused fibers that have a smaller input aperture at their input end than their output aperture at their emission end. For example, the diameter of the tapered fused fibers may deviate by a couple percent top to bottom. Of course, other diameter deviations may be implemented. This aperture deviation over the length of the tapered fused fibers results in a curvature (e.g., an S-bend) at the perimeter sides of edge sections 230 that overhangs bezel 245. In one embodiment, the tapered fused fibers are made of plastic (e.g., polymeric material) that is heated and compressed at the input end. In one embodiment, instead of compressing the input ends, the emission ends of the fused fibers are thermally expanded relative to the input ends.

Alternatively, the plastic or binding matrix material that holds the fused fibers together is expanded at the emission end relative to the input end to enlarge the surface area of emission side 220 relative to input side 215. The matrix expansion can be uniform or non-uniform, while the diameter of the individual fused fibers remains constant. This one sided (emission side 220) matrix expansion would also result in the curved shape of the fused fibers as illustrated in FIG. 2A. In the non-uniform embodiment, the one sided matrix expansion may be applied only to edge sections 230 or may be continuously adjusted across the whole emission side 220 of fused fiber bundle overlay 201. The matrix expansion results in an inter-fiber spacing in edge sections 230 on emission side 220 that is greater than the inter-fiber spacing in edge sections 230 on input side 215. In some embodiments, the spacing between fibers of fused fiber bundle overlay 201 may even be manipulated in various manners to reduce parts of an image to minimize or hide various aspects of a display.

Once fused fiber bundle overlay 201 is assembled, the emission ends of the fused fibers have a uniform output aperture size across the center and edge sections 225 and 230; however, the input ends of the fused fibers have a non-uniform input aperture size across the center and edge sections 225 and 230. As such, fused fiber bundle overlay 201 unevenly expands or magnifies the image in edge sections 230 relative to the center section 225. To compensate, display engine 250, which is responsible for driving the array of image pixels 235, pre-distorts the image provided to display pixels 235 in a non-uniform manner across edge sections 230 and center section 225 to pre-compensate for the uneven magnification caused by the tapered fused fibers relative to the straight fused fibers. Other software corrections to the display image may also be executed. For example, display engine 250 may adjust the image for brightness and contrast to compensate for losses in the fiber array. These image corrections may be applied across the entire array of image pixels 235.

Example dimensions for fused fibers bundle overlay 201 include: A=44 mm, B=3-4 mm, and C=3-4 mm. As a general rule, it is expected that the width A of edge sections 230 will be at least 10 times greater than the width C of the bezel 245 to be concealed. This approximate ratio provides adequate room to smooth out the non-uniform magnification distortion in software. Of course, these dimensions and ratios are mere examples, and it is contemplated that other dimensions and ratios (greater or smaller) may be implemented.

Although FIGS. 2A and 2B illustrate an embodiment where center section 225 includes straight fused fibers while edge sections 230 include tapered fused fibers, in other embodiments, fused fiber bundle overlay 201 may be uniformly or non-uniformly tapered across both center and edge sections. Uniformly magnifying the image may obviate the need to pre-compensate the image in software; however, fabrication of a uniform taper across the entire fused fiber bundle overlay 201 may require more complex fabrication techniques. Similarly, although FIGS. 2A and 2B illustrate fused fiber bundle overlay 201 as composed of five separate physical sections that are subsequently brought together, in other embodiments, fused fiber bundle overlay 201 may be fabricated of a variable number of individual pieces and even from a single contiguous fused fiber bundle with a continuous transition.

In the illustrated embodiment, fused fiber bundle overlay 201 includes a one-to-many correspondence between display pixels 235 and the overlaying fused fibers. In this one-to-many embodiment, display pixels 235 may range between 100 μm to 500 μm in diameter while each fused fiber may be approximately 50 μm in diameter. For example, each display pixel 235 may be overlaid by 10 to 100 fused fibers. Of course, in other embodiments, different dimensions of display pixels and fused fibers may be used, and in some embodiments, even a one-to-one ration of fused fibers to display pixels 235 may be implemented. Although the figures illustrate display pixels 235 as being organized into a regular rectangular array, it should be appreciated that the array of display pixels 235 may be organized into a regular or irregular tessellation of various pixel shapes (e.g., rectangular pixels, circular pixels, hexagonal pixels, etc.). Accordingly, the term "array" is boadly defined herein to include pixel layouts of both regular and irregular tessellations of various shapes.

Interconnecting optics 210 facilitates the optical coupling between fused fiber bundle 201 and display pixels 235. In one embodiment, interconnecting optics 210 includes an anti-reflective ("AR") coating and fuses or glues fused fiber bundle overlay 201 to display panel 205. In some embodiments, in order to reduce optical cross-talk between adjacent display pixels, it is often desirable to maintain interconnecting optics 210 as thin as reasonably possible. In some embodiments, interconnecting optics 210 includes an array of microlenses that correspond on a one-to-one basis with the individual fused fibers to focus the image light emitted from display pixels 235 into the individual fused fibers. Of course, AR coating and/or tailored output treatments may also be applied to emission side 220.

Figure 3A:
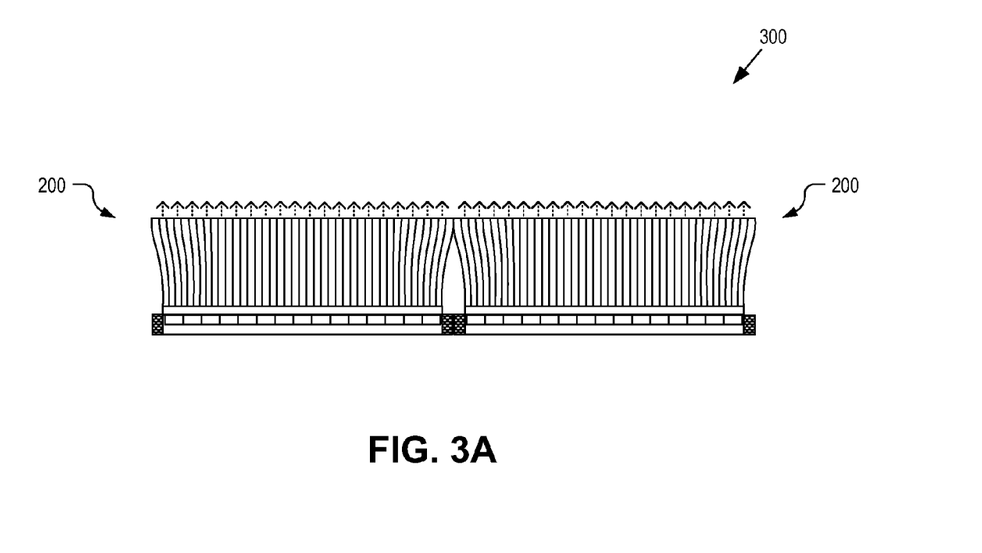
FIGS. 3A & 3B illustrate how multiple display tiles with fused fiber bundle overlays can be mated to form a seamless multi-panel display, in accordance with an embodiment of the disclosure.
Figure 3B:
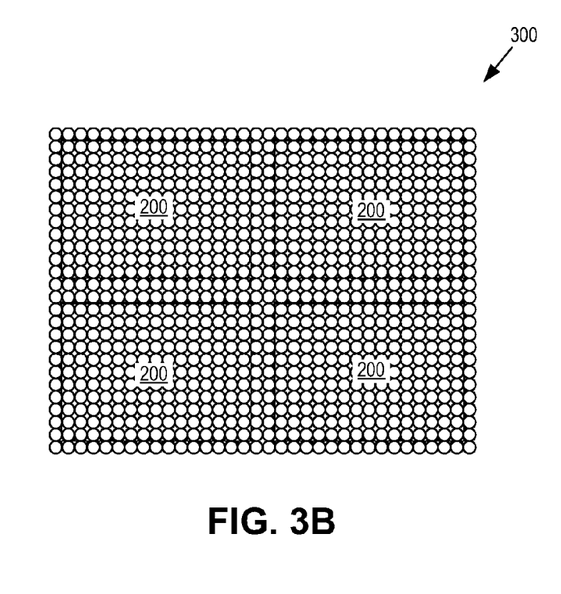

Instances of display tile 200 may be tiled together to form a larger multi-panel display 300 (see FIGS. 3A and 3B). Multi-panel display 300 is seamless or near-seamless at the physical interconnects (abutting seam) between adjacent display tiles 200. To reduce or virtually eliminate the seam between adjacent display panels 200, the overhang provided by edge sections 230 can extend equal to or past the outer edge of bezel 245 to fully conceal bezels 245 below the lip.

The seam between abutting display tiles 200 may be further concealed with additional design techniques. In one embodiment, the fused fibers have a dark (e.g., black) colored cladding, which servers to increase the contrast of the display tile, may reduce optical cross-talk or "light bleeding" between adjacent fibers, and results in dark outer edges at the seam between adjacent display tiles. A dark seam is less noticeable than a light colored seam. The dark cladding may be fabricated using carbon impregnated polymer cladding, which may surround a higher index clear acrylic core. In one embodiment, the core and cladding material is immiscible and therefore the dark cladding does not mix with the clear core when the fused fiber bundle is heated and compressed to form the tapered fused fiber sections. Alternatively, the dark material may be a separate coating (e.g., paint) that is applied to the fiber claddings. In one embodiment, the fiber cladding surrounding the perimeter fibers in fused fiber bundle overlay 201 is approximately half the thickness of the cladding of the interior fibers to permit adjacent display tiles to be closely abutted and maintain constant fiber-to-fiber spacing across inter-tile seams.

Another technique for further concealing the seam between adjacent display tiles 200 is to fabricate the abutting edges of two fused fiber bundle overlays 201 to have irregular shapes that mate. Irregular shapes may include a zigzag edge, inter-locking puzzle shapes, etc. Irregular patterns are less noticeable than straight lines or regular patterns. If adjacent display tiles 200 are not perfectly aligned, image discontinuities along the inter-panel seam may be introduced. Accordingly, irregular patterns help provide a sort of passive alignment. Other course, other mechanical passive alignment techniques may also be implemented. Otherwise, in one embodiment, these discontinuities may be remedied via appropriate feedback control and pixel remapping (discussed in greater detail in connection with FIG. 9).

Figure 4A:
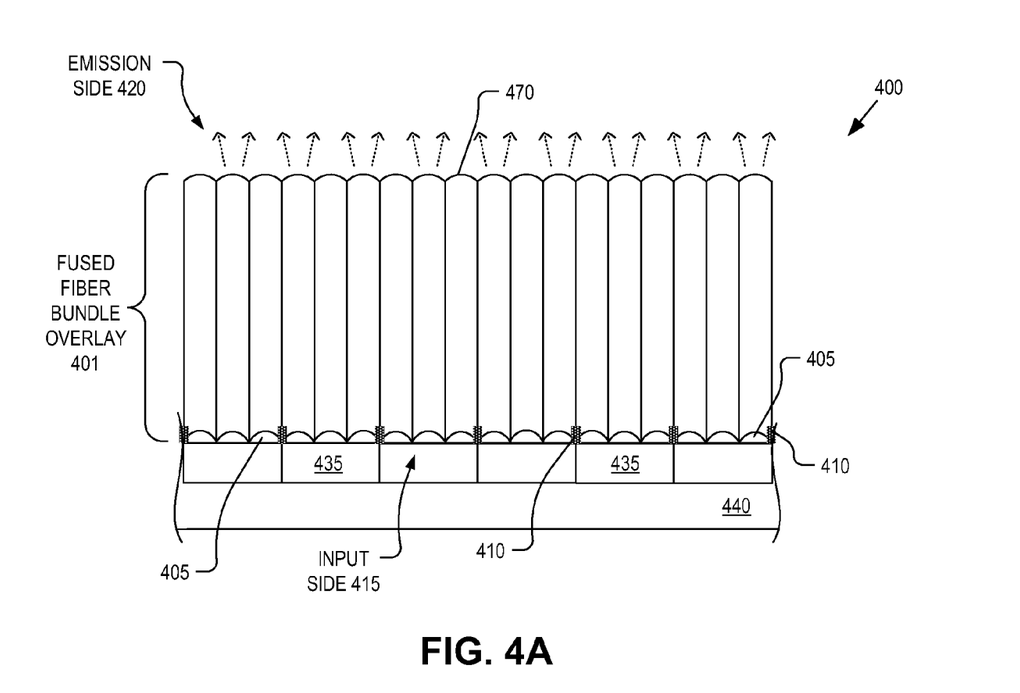
FIGS. 4A & 4B illustrate a portion of a display tile having lenses and cross-talk trenches formed into the input side of a fused fiber bundle overlay, in accordance with an embodiment of the disclosure.

As discussed above, using darkened fiber claddings for fused fiber bundle overlay 201 can server to increase the image contrast of display tile 200 by improving black levels and reducing ambient reflections. Additionally, interconnecting optics 210 may be engineered with difference refractive index materials to trap or block ambient light that travels down the fibers to prevent reflections back up the fused fibers, while also promoting the coupling of image light from the pixel array into fused fiber bundle overlay 201 (discussed in greater detail in connection with FIG. 4.

Substrate 240 may support a variety of different display pixel technologies. For example, display pixels 235 and substrate 240 may represent a liquid crystal display ("LCD"), a plasma display, a light emitting diode ("LED") display, a quantum dot array display, an organic LED ("OLED") display, an electro-luminescence display, or otherwise.

Figure 4B:
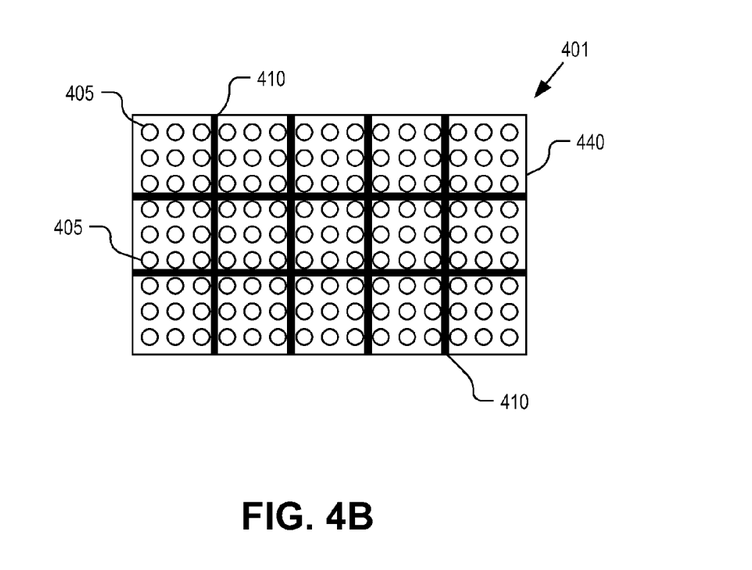

FIGS. 4A & 4B illustrate a portion of a display tile 400 having lenses and cross-talk trenches formed into an input side 415 of a fused fiber bundle overlay 401, in accordance with an embodiment of the disclosure. Display tile 400 is similar to display tile 200 with the following exceptions. Fused fiber bundle overlay 401 includes micro lenses 405 and cross-talk trenches 410 formed into input side 415 of fused fiber bundle overlay 401. Although interconnecting optics 210 are not illustrated in FIG. 4A, in some embodiments, one or more layers of interconnecting optics 210 may also be included. For example, an AR layer, a polarizing layer, a polarization rotating layer, etc. may be disposed between the array of display pixels 435 disposed in/on substrate 440 and fused fiber bundle overlay 401. Additionally, FIG. 4A illustrates how emission side 420 may also include divergence elements 470 formed into the emission end of each fused fiber of fused fiber bundle overlay 401. Divergence elements 407 may be divergence lenses or scattering surfaces. Divergence elements 470 may also be included in the embodiment illustrated in FIGS. 2A and 2B.

Micro lenses 405 and/or cross-talk trenches 410 are formed into input side 415 of fused fiber bundle overlay 401. In one embodiment, the physical shapes of these optical elements are etched into input side 415 and then optical material applied thereto. In another embodiment, micro-lenses 405 may be fabricated using a thermal process that melts the input ends into a lens shape. Convex and/or concave shapes may be achieved by using core and cladding plastics with different melt points and using surface tension to achieve the desired lens shape. In some embodiments, an AR coating or other engineered refractive index material (e.g., dichroic material, thin film filter, etc) is conformally or non-conformally applied to the concave or convex surfaces of each micro-lens 405. In another embodiment, micro-lenses 405 may be implemented as graded-index lenses formed by chemically treating the input ends of the fused fibers. Micro lenses 405 serve to reduce the acceptance angle of the input end of each fused fiber thereby reducing optical cross-talk. Micro-lenses 405 may also focus the image light into the input end of each fused fiber. In one embodiment, micro lenses 405 are fabricated on a one-to-one basis with the fibers and each is positioned beneath a fused fiber in optical alignment with a corresponding display pixel 435. Since the tapered fused fibers have a smaller input aperture on their input end than the straight fused fibers, the micro-lenses 405 may have different optical power between these two fiber groups to maintain a relative constant acceptance angle across both fiber groups.

Cross-talk trenches 410 are also etched into input side 415 of fused fiber bundle overlay 401. The illustrated embodiment of cross-talk trenches 410 surround the input ends of a fiber group associated with a single display pixel 435 in a grid pattern and serve to optically isolate adjacent display pixels 435 and reduce optical cross-talk noise between adjacent display pixels 435. Cross-talk trenches 410 may be filled with a dark or matte light absorbing material to absorb stray light rays. Cross-talk trenches 410 inhibit pixel light emitted from one display pixel 435 from being collected by a fused fiber associated with an adjacent display pixel.

Divergence elements 470 operate to increase the field of view of the light emitted from emission side 420. Divergence elements 470 are fabricated into the emission end of each fused fiber. Divergence elements 470 may be fabricated via a chemical etch and reflow process, or otherwise, to form a diverging len. Divergence elements 470 may also be implemented as graded-index lenses or other scattering surfaces.

In an embodiment with a one-to-one correspondence between fused fibers and display pixels 235 (not illustrated), microlenses 405 may be used to encapsulate and seal each display pixels 235. This embodiment may also eliminate cross-talk trenches 410, since the pixel emission aperture is placed in such close proximity to the input end of each fused fiber that the opportunity for cross-talk is minimal.

Figure 5:
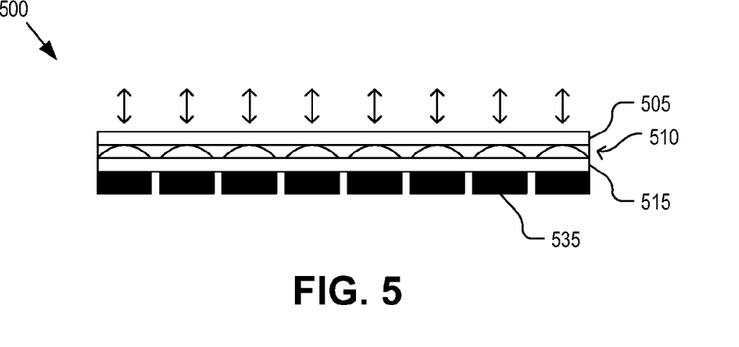
FIG. 5 illustrates an interconnecting optics layer including a circular polarizer and microlenses, in accordance with an embodiment of the disclosure.

FIG. 5 illustrates interconnecting optics 500, in accordance with an embodiment of the disclosure. Interconnecting optics 500 represent one possible implementation of interconnecting optics 210 illustrated in FIG. 2A. The illustrated embodiment of interconnecting optics 500 includes a circular polarizing layer 505, micro lenses 510, and an anti-reflective ("AR") layer 515 all disposed over display pixels 535. Circular polarizing layer 505 may be implemented as a quarter-wave plate retarder. Display pixels 535 may be implemented as an OLED display, which is often combined with a circular polarizer to block reflected light. If display pixels 535 are implemented using other display technologies that do not use a circular polarizer, then a circular polarizer or quarter-wave plate retarder may be positioned above display pixels 535 to block reflected light. During operation, ambient light that travels backwards down the fused fiber bundle overlay 201 is circularly polarized by circular polarizing layer 505, which once reflected off of display pixels 535 the handedness of the circular polarization of the light is reversed from left to right or right to left, and blocked by circular polarizing layer 505 along the reverse path before being collected into fused fiber bundle overlay 201. Thus, the illustrated embodiment of interconnecting optics 500 servers to reduce back reflections and improve image contrast. Of course, the order of micro lenses 510 and circular polarizing layer 505 may be switched in other embodiments not illustrated.

Figure 6:
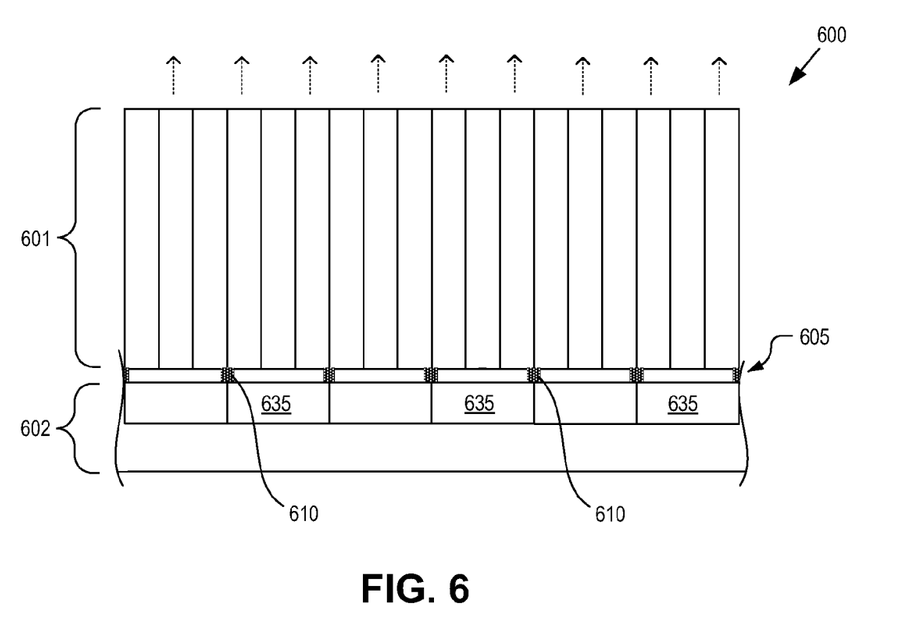
FIG. 6 illustrates an interconnecting optics layer including cross-talk blocks to optically isolate adjacent display pixels, in accordance with an embodiment of the disclosure.

FIG. 6 illustrates a portion of a display tile 600 including an interconnecting optics layer 605 having cross-talk blocks 610 disposed therein to optically isolate adjacent display pixels 635, in accordance with an embodiment of the disclosure. Interconnecting optics layer 605 may be formed of a clear or transparent material (e.g., polymer) that has been patterned to form a grid of cross-talk blocks 610. Cross-talk blocks 610 are formed of dark light absorbing or matte opaque material. The grid of cross-talk blocks 610 may be similar to the grid of cross-talk trenches 410 illustrated in FIG. 4B and serve a similar purpose. However, cross-talk blocks 610 are disposed in a distinct material layer between fused fiber bundle overlay 601 and display panel 602.

Figure 7A:
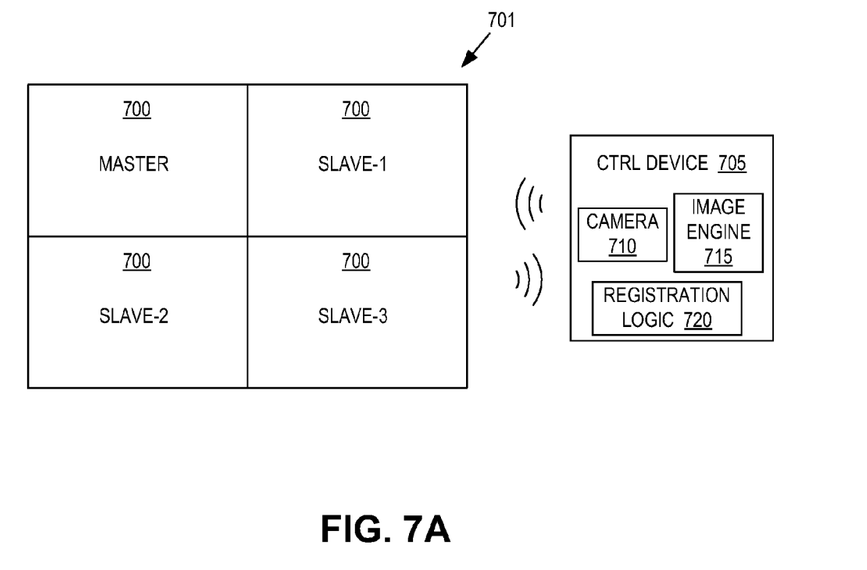
FIGS. 7A & 7B illustrate various communication protocols for displaying a composite image across multiple display tiles of a multi-panel display, in accordance with an embodiment of the disclosure.
Figure 7B:
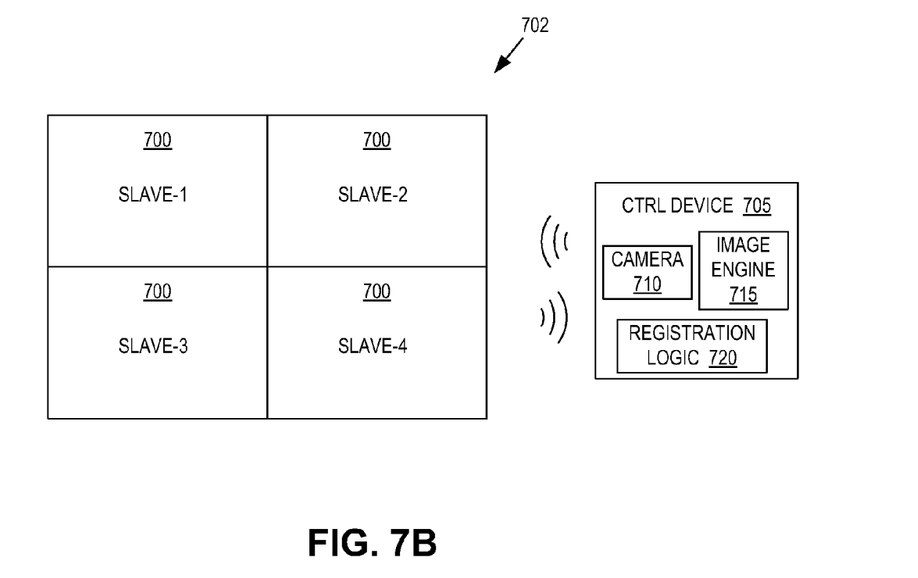

FIGS. 7A & 7B illustrate various communication protocols for displaying a composite image across multiple display tiles 700 of a multi-panel display 701, in accordance with an embodiment of the disclosure. Each display tile 700 may be implemented with any of display tiles 200, 400, 600, or any combination thereof. FIG. 7A illustrates a technique where one of the display tiles 700 operates as a master and the remaining display tiles 700 operate as slaves that communicate with the master. The master device may be identical to the other slave devices, but merely designated as a master during operation. For example, the master device may be the first display tile 700 logically added to the multi-panel display 701. As new display panels 700 are added or existing display tiles 700 removed, the master display tile 700 may be responsible tracking and assigning display statuses and roles. In another embodiment, the master device may include additional interface electronics (e.g., wireless transceiver) not included in the other slave display tiles 700 for communicating with a control device 705. The control device 705 may communicate display images and control information with the master display tile 700, which then relays the appropriate portions of the display images to the respective slave display tiles 700. FIG. 7B illustrates a more distributed protocol where all display tiles 700 are identical and operate as slave devices controlled directly by control device 705. Various registration markers may be used to identify and distinguish the various display tiles 700. For example, magnetic bits, RFID, optical markers, active links, or various bus interfaces and signaling protocols may be used.

The illustrated embodiment of control device 705 includes a camera 710, an image engine 715, and registration logic 720. In one embodiment, control device 705 may be implemented with a smart phone having a general purpose processor, a built in camera, and wireless interface electronics (e.g., WiFi or Bluetooth transceivers). The wireless interface electronics may be used to stream the composite image to display tiles 700. Operation of control device 705 to setup and configure multi-panel displays 701 or 702 is discussed in further detail in connection with FIG. 9.

Figure 8A:
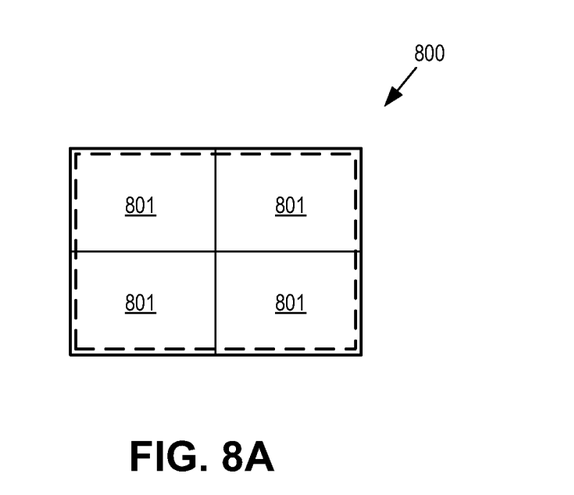
FIGS. 8A-8C illustrate techniques for implementing intelligent reformatting/reconfiguration of a display image when an individual display tile is added to or removed from a multi-panel display, in accordance with an embodiment of the disclosure.
Figure 8B:
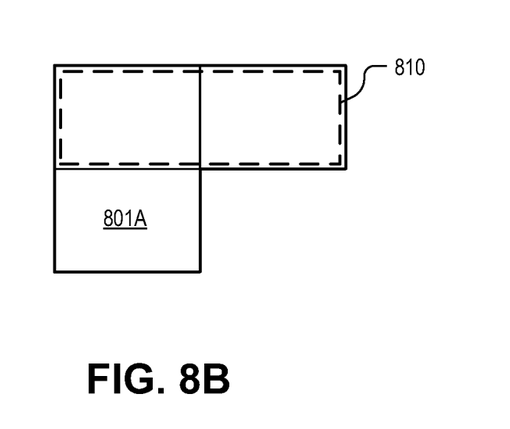
Figure 8C:
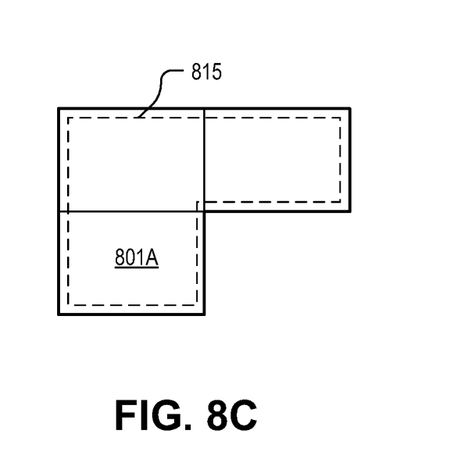

FIGS. 8A-8C illustrate techniques for implementing intelligent reformatting/reconfiguration of a display image when an individual display tile is added or removed from a multi-panel display 800, in accordance with an embodiment of the disclosure. Each display tile 801 may be implemented with any of display tiles 200, 400, 600, or any combination thereof. When tiles are added to or removed from multi-panel display 800, the remaining display tiles 801 may be intelligently reconfigured to effectively use the resulting display area. Intelligent reconfiguration may include adjusting image resolution or switching between a complex display interface for large composite display areas and a simplified display interface for small composite displays (i.e., when the display area rises above or drops below a threshold size).

FIGS. 8B and 8C illustrate configuration options when the addition or removal of a display tile 801 results in an irregular shaped display area. In FIG. 8B, the display tile 801A forming the irregular shape is unused and the display image reverts to the largest available rectangular shaped area 810. In FIG. 8C, display tile 801A is used and the display image follows the irregular shaped area 815.

Figure 9:
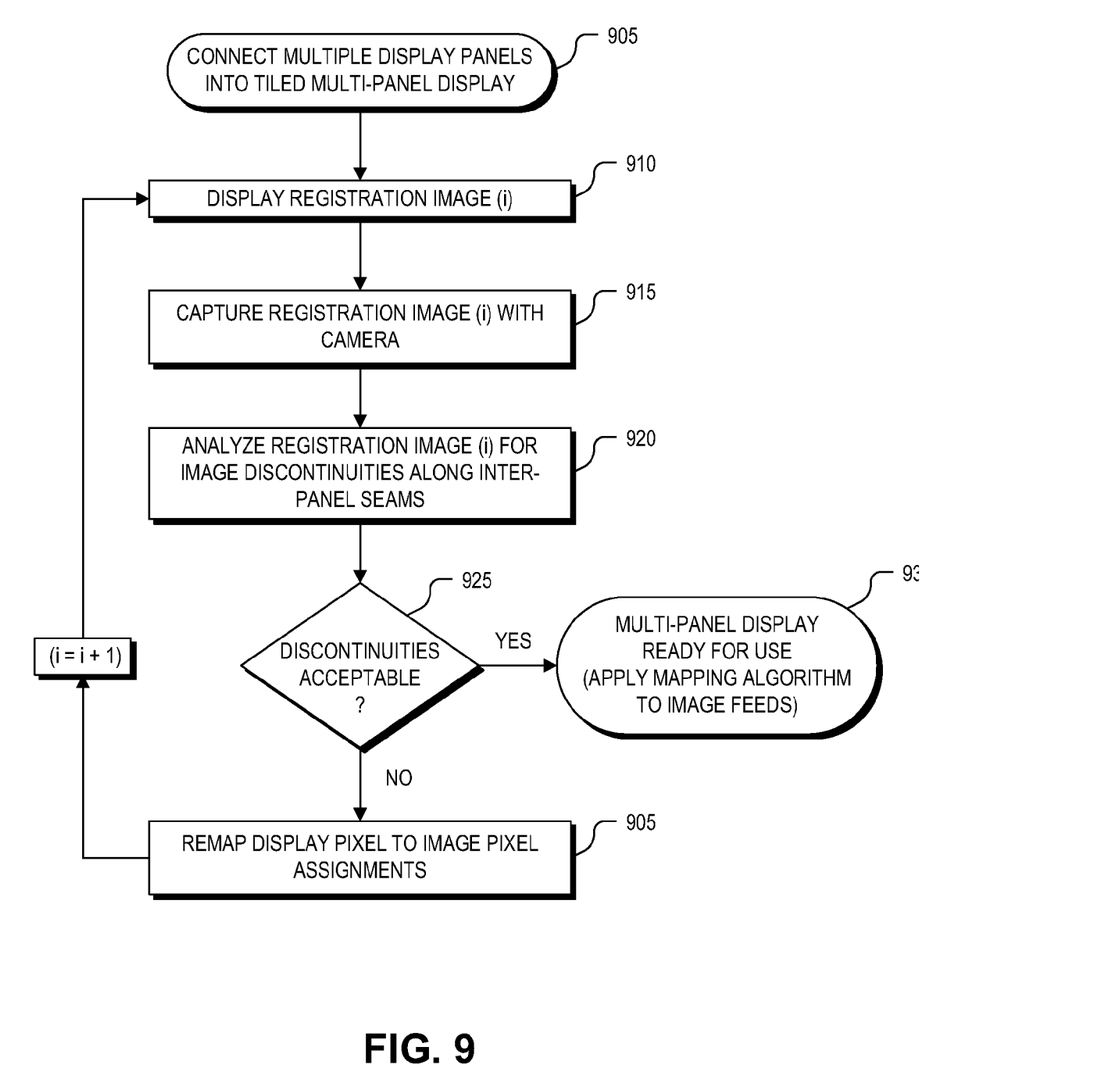
FIG. 9 illustrates a process for image registration to cure misalignments between connected display tiles of a multi-panel display, in accordance with an embodiment of the disclosure.

FIG. 9 illustrates a process 900 for image registration to cure misalignments between connected display tiles of a multi-panel display, in accordance with an embodiment of the disclosure. Process 900 is described with reference to FIG. 7A. The order in which some or all of the process blocks appear in process 900 should not be deemed limiting. Rather, one of ordinary skill in the art having the benefit of the present disclosure will understand that some of the process blocks may be executed in a variety of orders not illustrated, or even in parallel.

When coupling two or more display tiles 700 together, perfect physical alignment may not be achieved. Process 900 operates to identify misalignments or image discontinuities along the seams of a tiled multi-panel display and remap display pixel to image pixel assignments to cure the misalignment defects.

In a process block 905, two or more display tiles 700 are coupled together to form a tiled multi-panel display 701. As previously stated, this coupling may result in one or more image discontinuities along the inter-panel seams. To cure these defects, image engine 715 generates an initial registration image i (e.g., i=1) for transmission to display tiles 700. In one embodiment, registration image i is an alternating high contrast image (e.g., black and white checkerboard image) that provides several identifiable marks along the seam edges of each display tile 700 or displays a full screen image that provides enough information to recover the full position and orientation of each panel relative to one another.

In a process block 915, camera 710 is used to capture registration image i output from multi-panel display 701. The captured registration image i is then analyzed by registration logic 720 to identify any misalignment between panels (process block 920). If the misalignment is determined to be unacceptable (decision block 925), then registration logic 720 adjusts the display pixel to image pixel mapping in an attempt to cure the discontinuities or at least reduce the number of image discontinuities. With the pixel assignments remapped, process 900 loops back to process block 910 and may iterate by redisplaying a revised registration image i. The registration iterations may continue until the alignment is determined to be within acceptable limits (decision block 925), at which time multi-panel display 701 is ready for use. Alternatively, this software alignment may be computed from a single calibration image. The remapped display pixel to image pixel assignments are maintained and used for all image feeds until the next recalibration cycle.

In some embodiments, the image registration technique described in connection with FIG. 9 may further be used to smooth out other image discontinuities between the tiled panels than just physical misalignment of the display tiles. For example, the image registration technique may be used to adjust brightness, color temperature, etc. between the display tiles to achieve uniform image characteristics and avoid perceived image characteristic boundaries between the tiled panels. Feedback from the displayed registration images can be used to adjust and smooth these differences. The image registration technique can even be used to smooth differences between individual pixels within a given display tile, if the underlying display permits such pixel-to-pixel adjustments.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A display, comprising:
   a display panel including an array of display pixels to emit image light and a bezel surrounding the array of display pixels; and
   a fused fiber bundle overlay disposed over the display panel to guide the image light emitted from the display pixels, the fused fiber bundle overlay including:
   an input side mounted adjacent to the display panel and optically aligned with the array of display pixels to receive the image light emitted from the display pixels;
   an emission side opposite the input side to emit the image light, wherein the emission side has a larger surface area than the input side; and
   an array of fused fibers each extending from the input side to the emission side and each including an input end at the input side and an emission end at the emission side, wherein at least a portion of the fused fibers are tapered such that the input end of a tapered fused fiber has an input aperture that is smaller than an output aperture of the output end of the tapered fused fiber,
   wherein the fused fibers each comprise a core material with a higher refractive index than a cladding material surrounding the core material.

2. The display of claim 1, wherein the emission side of the fused fiber bundle overlay overhangs the bezel surrounding the array of display pixels to conceal the bezel.

3. The display of claim 2, wherein the fused fiber bundle overlay overhangs to conceal the bezel on four sides of the display panel.

4. The display of claim 1, wherein the fused fiber bundle overlay further includes:
   a center section of straight fused fibers; and
   edge sections including the tapered fused fibers, the edge sections residing along a perimeter of the center section,
   wherein the emission end of the fused fibers have a uniform output aperture size across the center and edge sections,
   wherein the input end of the fused fibers have a non-uniform input aperture size across the center and edge sections.

5. The display of claim 4, wherein the tapered fused fibers magnify the image light relative to the straight fused fibers, the display further comprising:
   a display engine coupled to drive the display pixels, wherein the display engine pre-distorts an image provided to the display pixels in a non-uniform manner across the display panel to pre-compensate for the magnification difference between the tapered fused fibers relative to the straight fused fibers.

6. The display of claim 4, wherein the tapered fused fibers of the edge sections comprise polymeric material that is thermally compressed at the input side relative to the emission side, or thermally expanded at the emission side relative to the input side, forming a curvature to the tapered fused fibers along a length of the tapered fused fibers from the input ends to the emission ends.

7. The display of claim 1, wherein the array of fused fibers each includes a dark fiber cladding or a dark material coating cladding of the fused fibers to increase display contrast.

8. The display of claim 1, wherein the display pixels and the fused fibers have a one-to-many correspondence such that each of the display pixels outputs the image light to many overlaying fused fibers.

9. The display of claim 1, wherein the fused fiber bundle overlay further includes a lens disposed into the input end of each of the fused fibers to reduce the acceptance angle associated with the input end of the fused fibers.

10. The display of claim 9, wherein the lens comprises one of a curved refractive micro-lens or a graded-index lens.

11. The display of claim 1, wherein the fused fiber bundle overlay further includes:
   cross-talk trenches disposed in the input side of the fused fiber bundle overlay, the cross-talk trenches surrounding a group of the input ends to group the fused fibers associated with a given display pixel; and opaque material disposed within the cross-talk trenches to block stray light and reduce optical cross-talk between adjacent groups of the fused fibers.

12. The display of claim 1, further comprising interconnecting optics disposed between the fused fiber bundle overlay and the display panel, the interconnecting optics including:

cross-talk trenches surrounding a group of the input ends to group the fused fibers associated with a given display pixel; and opaque material disposed within the cross-talk trenches to block stray light and reduce optical cross-talk between adjacent groups of the fused fibers.

13. The display of claim 1, further comprising interconnecting optics disposed between the fused fiber bundle overlay and the display panel, the interconnecting optics including:

a circular polarizing layer, wherein the display panel comprises an organic light emitting diode ("OLED") panel that rotates a polarization of ambient light incident on the OLED panel by 180 degrees, wherein a combination of the circular polarizer and the OLED panel reduces reflections of the ambient light.

14. The display of claim 1, further comprising interconnecting optics disposed between the fused fiber bundle overlay and the display panel, the interconnecting optics including:

an array of micro lenses to direct the image light emitted from the array of display pixels into the input end of the fused fibers; and an anti-reflective coating.

15. The display of claim 1, wherein the emission end of each of the fused fibers includes a divergence element to increase a divergence of the image light emitted from the emission end of the fused fibers.

16. The display of claim 15, wherein the divergence element comprises one of a curved end surface, a graded-index lens, or a scattering surface formed in the emission end of each of the fused fibers.

17. A multi-panel display including a plurality of display tiles mated to each other along one or more seams, each of the display tiles comprising:

a display panel including an array of display pixels to emit image light and a bezel disposed around the array of display pixels as a trim that surrounds a periphery of the display pixels;

a fused fiber bundle overlay disposed over the display panel to guide the image light emitted from the display pixels, the fused fiber bundle overlay including:

an input side mounted adjacent to the display panel and optically aligned with the array of display pixels to receive the image light emitted from the display pixels;

an emission side opposite the input side to emit the image light, wherein the emission side has a larger surface area than the input side and overhangs the bezel to conceal the bezel;

an array of fused fibers each extending from the input side to the emission side and each including an input end at the input side and an emission end at the emission side, wherein at least a portion of the fused fibers are tapered such that the input end of a tapered fused fiber has an input aperture that is smaller than an output aperture of the output end of the tapered fused fiber;

a center section of straight fused fibers; and edge sections including the tapered fused fibers, the edge sections residing along a perimeter of the center section; and a display engine coupled to drive the display pixels, wherein the display engine pre-distorts an image provided to the display pixels in a non-uniform manner across the display panel to pre-compensate for a magnification difference between the tapered fused fibers relative to the straight fused fibers, wherein the emission side of the fused fiber bundle overlay of adjacent display tiles mate together and conceal the bezels disposed along the seam between the adjacent display tiles.

18. The multi-panel display of claim 17, wherein the emission side of the fused fiber bundle overlay overhangs the bezel surrounding the array of display pixels to conceal the bezel.

19. The multi-panel display of claim 17, wherein the emission end of the fused fibers have a uniform output aperture size across the center and edge sections, wherein the input end of the fused fibers have a non-uniform input aperture size across the center and edge sections.

20. The multi-panel display of claim 19, wherein the tapered fused fibers magnify the image light relative to the straight fused fibers.

21. The multi-panel display of claim 19, wherein the tapered fused fibers of the edge sections comprise plastic that is thermally compressed at the input side relative to the emission side forming a curvature to the tapered fused fibers along a length of the tapered fused fibers from the input ends to the emission ends.

22. The multi-panel display of claim 17, wherein the array of fused fibers each includes a dark fiber cladding to increase display contrast.

23. The multi-panel display of claim 17, wherein the display pixels and the fused fibers have a one-to-many correspondence such that each of the display pixels outputs the image light to many overlaying fused fibers.

24. The multi-panel display of claim 17, wherein the fused fiber bundle overlay further includes a lens disposed into the input end of each of the fused fibers to reduce the acceptance angle associated with the input end of the fused fibers.

25. The multi-panel display of claim 17, wherein the fused fiber bundle overlay further includes:

cross-talk trenches disposed in the input side of the fused fiber bundle overlay, the cross-talk trenches surrounding a group of the input ends to group the fused fibers associated with a given display pixel; and opaque material disposed within the cross-talk trenches to block stray light and reduce optical cross-talk between adjacent groups of the fused fibers.

26. The multi-panel display of claim 17, wherein the emission end of each of the fused fibers includes a divergence element to increase a divergence of the image light emitted from the emission end of the fused fibers.

27. A display tile, comprising:

a display panel including an array of display pixels to emit image light and a bezel surrounding the array of display pixels; and a fused fiber bundle overlay disposed over the display panel to guide the image light emitted from the display pixels, the fused fiber bundle overlay including:

an input side mounted adjacent to the display panel and optically aligned with the array of display pixels to receive the image light emitted from the display pixels;

an emission side opposite the input side to emit the image light, wherein the emission side has a larger surface area than the input side; and an array of fused fibers each extending from the input side to the emission side and each including an input end at the input side and an emission end at the emission side, wherein a matrix spacing between the fused fibers is non-uniform across the emission side and expands in edge sections relative to a center section such that an inter-fiber spacing in the edge sections on the emission side is greater than the inter-fiber spacing in the edge sections on the input side, wherein a diameter of each fused fiber within the array of fused fibers is constant along a length of each fused fiber extending from the input side to the emission side.

28. A display, comprising:

a display panel including an array of display pixels to emit image light and a bezel surrounding the array of display pixels; and a fused fiber bundle overlay disposed over the display panel to guide the image light emitted from the display pixels, the fused fiber bundle overlay including:

an input side mounted adjacent to the display panel and optically aligned with the array of display pixels to receive the image light emitted from the display pixels;

an emission side opposite the input side to emit the image light, wherein the emission side has a larger surface area than the input side; and an array of fused fibers each extending from the input side to the emission side and each including an input end at the input side and an emission end at the emission side, wherein at least a portion of the fused fibers are tapered such that the input end of a tapered fused fiber has an input aperture that is smaller than an output aperture of the output end of the tapered fused fiber, wherein the emission end of the fused fibers have a uniform output aperture size across the fused fiber bundle overlay, wherein the input end of the fused fibers have a non-uniform input aperture size across the fused fiber bundle overlay.

* * * * *